(12) United States Patent
Nesamoney et al.

(10) Patent No.: US 8,539,510 B2
(45) Date of Patent: Sep. 17, 2013

(54) METHOD FOR PROVIDING A REAL TIME VIEW OF HETEROGENEOUS ENTERPRISE DATA

(75) Inventors: Diaz H. Nesamoney, Atherton, CA (US); Weipeng Paul Yan, Redwood City, CA (US); Jameison Bear Martin, Oakland, CA (US); Maurice Mate Radalj, San Francisco, CA (US); Fayyaz Ahmad Younas, Fremont, CA (US)

(73) Assignee: International Business Machines Coporation, Armonk, NY (US)

( * ) Notice: Subject to any disclaimer, the term of this patent is extended or adjusted under 35 U.S.C. 154(b) by 971 days.

(21) Appl. No.: 12/400,626

(22) Filed: Mar. 9, 2009

(65) Prior Publication Data

US 2009/0171927 A1 Jul. 2, 2009

Related U.S. Application Data

(62) Division of application No. 10/446,336, filed on May 27, 2003, now Pat. No. 7,523,462.

(51) Int. Cl.
*G06F 17/30* (2006.01)
*G06F 9/46* (2006.01)

(52) U.S. Cl.
USPC ........................................................ 719/318

(58) Field of Classification Search
None
See application file for complete search history.

(56) References Cited

U.S. PATENT DOCUMENTS

| | | | |
|---|---|---|---|
| 5,706,495 A * | 1/1998 | Chadha et al. | ........................ 1/1 |
| 6,112,198 A | 8/2000 | Lohman et al. | |
| 6,272,502 B1 | 8/2001 | Lieuwen et al. | |
| 6,289,335 B1 | 9/2001 | Downing et al. | |
| 6,292,803 B1 | 9/2001 | Richardson et al. | |
| 6,480,836 B1 | 11/2002 | Colby et al. | |
| 6,480,842 B1 | 11/2002 | Agassi et al. | |
| 6,505,188 B1 | 1/2003 | Ghazal et al. | |
| 6,598,039 B1 | 7/2003 | Livowsky | |
| 6,681,230 B1 | 1/2004 | Blott et al. | |
| 6,725,287 B1 | 4/2004 | Loeb et al. | |
| 6,768,987 B1 | 7/2004 | Couch et al. | |

(Continued)

OTHER PUBLICATIONS

Microsoft Windows 2000 Administrator's Pocket Consultant; excerpt from Chapter 3; Feb. 12, 2000; http://technet.microsoft.com/en-us/library/bb726966.aspx; 3 pages.*

(Continued)

*Primary Examiner* — H S Sough
*Assistant Examiner* — Kimberly Jordan
(74) *Attorney, Agent, or Firm* — Shumaker & Sieffert, P.A.

(57) ABSTRACT

A method for providing a real time view of heterogeneous enterprise data of operational systems includes capturing streams of operational events in real time, combining the events with contextual data, and materializing a resulting view. The resulting view includes a dynamically defined view of the stream of events and provides visibility into a current state of the operational system. A view snapshot is continuously incrementally updated by a view maintenance engine as a stream of rows. The views are used to evaluate a business rule. An alert is fired when a business rule holds true. To enable the view in a view engine, a SQL string characterizing the view is parsed into a parse tree, which is normalized to form a query graph. The query graph is then optimized to obtain a query plan, which is compiled into an operator graph. Queries are executed based upon the operator graph.

22 Claims, 11 Drawing Sheets

(56) References Cited

U.S. PATENT DOCUMENTS

| | | |
|---|---|---|
| 6,785,673 B1 | 8/2004 | Fernandez et al. |
| 6,882,977 B1 | 4/2005 | Miller |
| 7,043,727 B2 | 5/2006 | Bennett et al. |
| 7,124,204 B2 | 10/2006 | Givoly et al. |
| 7,139,844 B2 | 11/2006 | Smith et al. |
| 7,440,963 B1 | 10/2008 | Bello et al. |
| 7,448,048 B1 | 11/2008 | Nesamoney et al. |
| 2002/0060696 A1 | 5/2002 | Seetharaman et al. |
| 2002/0062237 A1 | 5/2002 | Matsumoto et al. |
| 2002/0194095 A1 | 12/2002 | Koren |
| 2003/0018506 A1 | 1/2003 | McLean et al. |
| 2003/0033179 A1 | 2/2003 | Katz et al. |
| 2003/0097367 A1 | 5/2003 | Ma et al. |
| 2003/0144828 A1 | 7/2003 | Lin |
| 2003/0187984 A1* | 10/2003 | Banavar et al. ............... 709/225 |
| 2003/0212789 A1 | 11/2003 | Hamel et al. |
| 2003/0225769 A1 | 12/2003 | Chkodrov et al. |
| 2003/0225820 A1 | 12/2003 | Chkodrov et al. |
| 2003/0227479 A1 | 12/2003 | Mizrahi et al. |
| 2003/0236860 A1 | 12/2003 | Yegin |
| 2004/0019684 A1 | 1/2004 | Potter et al. |
| 2004/0030739 A1 | 2/2004 | Yousefizadeh |
| 2004/0034661 A1 | 2/2004 | Barron et al. |
| 2004/0128342 A1 | 7/2004 | Maes et al. |
| 2004/0186860 A1 | 9/2004 | Lee et al. |
| 2004/0267828 A1 | 12/2004 | Zwilling et al. |
| 2005/0091180 A1 | 4/2005 | Peleg et al. |
| 2005/0198614 A1 | 9/2005 | Mavashev et al. |
| 2005/0278341 A1 | 12/2005 | Kostadinov et al. |
| 2006/0116984 A1 | 6/2006 | Zurek |
| 2007/0130113 A1 | 6/2007 | Ting |
| 2008/0043256 A1 | 2/2008 | Broda et al. |
| 2008/0101369 A1 | 5/2008 | Sandoz et al. |

OTHER PUBLICATIONS

Final Office Action for U.S. Appl. No. 12/243,557 dated Mar. 21, 2011 (27 pages).

Amendment filed for U.S. Appl. No. 12/243,557 on Aug. 19, 2011 (15 pages).

U.S. Appl. No. 10/446,338, filed May 27, 2003 entitled "Method for Performing Real-Time Analytics Using a Business Rules Engine on Real-Time Heterogenous Materialized Data Views" by Nesamoney et al.

U.S. Appl. No. 10/749,317, filed Dec. 31, 2003 entitled "A Method and System for Dynamically Joining Views That Share a Common Key in a Streaming Database System" by Yan et al.

U.S. Appl. No. 10/750,507, filed Dec. 31, 2003 entitled "A Method and System for Dynamically Initializing a View for a Streaming Data Base System" by Yan et al.

U.S. Appl. No. 60/941,166, filed May 31, 2007 entitled "Streaming Multidimensional Data by Bypassing Multidimensional Query Processor" by Gupta.

U.S. Appl. No. 11/765,277, filed Jun. 19, 2007 entitled "Streaming Multidimensional Data by Bypassing Multidimensional Query Processor" by Gupta.

U.S. Appl. No. 12/243,557, filed Oct. 1, 2008 entitled "Method for Performing Real-Time Analytics Using a Business Rules Engine on Real-Time Heterogenous Materialized Data Views" by Nesamoney et al.

Office Action from U.S. Appl. No. 12/243,557, dated Feb. 28, 2012 (29 pages).

Amendment in response to Office Action mailed Feb. 28, 2012 from U.S. Appl. No. 12/243,557, filed May 29, 2012 (17 pages).

* cited by examiner

METHOD FOR PROVIDING A REAL TIME VIEW OF HETEROGENEOUS ENTERPRISE DATA

This application is a divisional of U.S. application Ser. No. 10/446,336, filed May 27, 2003 and entitled "METHOD FOR PROVIDING A REAL TIME VIEW OF HETEROGENEOUS ENTERPRISE DATA," the entire content of which is incorporated herein by reference.

FIELD OF THE INVENTION

The present invention relates to the field of business intelligence. More specifically, embodiments of the present invention relates to a method for providing a real time view of heterogeneous enterprise data.

BACKGROUND ART

Business intelligence and data warehousing software enable information from disparate parts of an enterprise to be obtained with relative ease. Great decision-making benefits are generated by business intelligence (BI). BI software integrates querying, reporting, on-line analytic processing (OLAP), data mining, and data warehousing functionality.

Such decision-making benefits are provided by BI software because they enable a user to process information from as many databases as comprise a business (or other) organization's data storage resources. Further, BI software allows analysis of needed transactions and summaries, without having to know which databases, servers, and/or other information sources from which the information underpinning such transactions and summaries were derived.

By way of background with respect to the applications to business and other enterprises, an 'event' represents a business event, which is a business activity, transaction, or a change in the state of a business entity, for instance, in a large business. Implicitly, events comprise a time of occurrence and an identity. Examples of events include, but are not limited to, issuing a purchase order, taking a customer service call, replenishing supplies, issuing a forecast, and posting an expense item.

A 'context' represents data associated with an event. Typically, contexts are data that are descriptive of the events. A context can also comprise historic summary data, which can be available in a data warehouse or operational data store (ODS). Context data may also be obtained from other systems of record. Context data provides additional information that may be required for adding meaning to an event. Context data, in so far as it can be conventionally utilized, can be evaluated to ascertain whether or not a given event should trigger a heightened state of scrutiny and observation by analysts of the business environment in which a business or other enterprise is immersed.

Modern businesses face significant and increasing needs to obtain real time access to key business events. This need, for instance, can be expressed as a requirement from a business person that indicates that the certain business metrics need to be monitored in real-time or that when certain changes in these metrics caused by various business events imply adverse conditions or an opportunity, this is cause for an 'alert', e.g., notation of event occurrence, and heightened monitoring of associated data thereafter.

The event, for example could be an increase in call volume into a call center, inventory falling below a certain threshold level, a drop in a demand forecast, increase in the number of returns of a certain product, or that defect rates from a test system exceeded pre-specified limits, etc. At the occurrence of such an event, the business person may want a corresponding alert to attract and guide her/his attention.

Conventional reporting and analysis software (variously called Business Intelligence, Query and reporting tools, Data warehouses etc.) ("BI software") all provide reporting and analysis of business data. They do so by either executing queries directly against operational systems or by extracting and transforming in batches, operational data to an independent data store (sometimes called a data warehouse or data mart).

The above method by conventional reporting software results in the usage of a fixed (or static) data model from which data is analyzed. As a result of that, alert conditions cannot be detected without repeatedly running the reports on the data model, often resulting in poor performance of reports or an impact on the operational system itself, if reports are being run directly on it. In addition since the data is often extracted in batches, the resulting metrics are often hours to days old and therefore unsuitable for real-time analytics.

Some conventional reporting products contain alerting technology, however the alerting is based on repeated processing of batch data and on a fixed data model that is inflexible to the needs of real-time analytics.

Other mechanisms, also called event management software provides for alert conditions to be detected and alerts sent, however, it similarly uses fixed data models and batch updates to the data model and suffers the associated drawbacks described above.

Without event processing capabilities, the ability to combine events with context, and powerful business rules processing capability, the ability of a business organization or a similar organization utilizing BI software to engage in real time data analysis is limited. Lacking ability to engage in real time data analysis, a business organization or a similar organization utilizing BI software has only a limited capability at best to react instantaneously to changes in its business and to the business environment in which it operates.

SUMMARY OF THE INVENTION

A method for providing a real time view of heterogeneous enterprise data of operational systems is disclosed. The method comprises capturing a stream of operational events in real time and materializing a resulting view. The resulting view comprises a dynamically defined view of the stream of events and provides visibility into a current state of the operational system.

In one embodiment, a view snapshot is continuously incrementally updated by a view maintenance engine as a stream of rows. Context, which is static or changes relatively slowly, is updated upon changes to a context table as that context table is added to a next row. Views include business views and hidden views. The views are used by a rules engine to define hidden views for evaluating a business rule. A user can define a business rule from online. An alert is fired when a business rule holds true. Views can be stateful or stateless. A view is stateful if it contains states determined by stream data consumed by the view; otherwise, it is stateless.

A resultant view can be generated by a view defined by a query in a Structured Query Language (SQL), joining across several views where one view comprises an event view and the remainder comprise a context view, modeling the event as a data stream and the context view as a relation, retrieving a row corresponding to the context view, and constructing a compound row(s) comprising a row(s) from the data stream and a row(s) from the context view.

To enable the view in a view engine, where the view is received as a SQL string, the SQL string is parsed into a parse tree, which is normalized to form a query graph. The query graph is then optimized to obtain a query plan, which is compiled into an operator graph. Queries are executed based upon the operator graph.

DETAILED DESCRIPTION OF THE INVENTION

A method for generating a real time view of heterogeneous enterprise data is disclosed. In the following detailed description of an embodiment of the present invention, a method for generating a real time view of heterogeneous enterprise data, numerous specific details are set forth in order to provide a thorough understanding of the present invention. However, it will be recognized by one skilled in the art that the present invention may be practiced without these specific details or with equivalents thereof. In other instances, well-known methods, procedures, and components, have not been described in detail as not to unnecessarily obscure aspects of the present invention.

Embodiments of the present invention are directed to a method for generating a real time view of heterogeneous enterprise data that are both event-definitive and context-definitive and can provide a streaming view of dynamically changing data. In one embodiment, a computer-based system executes the method for generating a real time view of heterogeneous enterprise data. In one embodiment, a computer usable medium having a computer readable program code embodied therein causes a computer system to perform the method for generating a real time view of heterogeneous enterprise data.

Thus, an embodiment of the present invention overcomes the limitations of conventional BI software, which is neither sufficiently event-definitive nor context-definitive, and which assumes data is operated on in scheduled batches, not event driven, and not external to a particular database system. An embodiment of the present invention readily formulates and sustains a maintainable real time view of business events, such as transactions, and related occurrences, incidents, and circumstances. The view can be an asynchronous one. Further, an embodiment of the present invention has contextually interpretive and dynamically predictive capability.

Notation and Nomenclature

As the terms are used herein, the following terms can have meanings comprising the following definitions. An 'event' is any change in the value of a critical data element in a transactional system that must be captured for the purpose of monitoring its value.

A 'context' is additional information added to an event to make it easier and/or more profitable to analyze the event to determine whether action is needed. 'Event context' is the combination of an event view with a context. An event context can be an entity on which an end user alerting business rule is built. Event context appears in one embodiment as a simple view in Structured Query Language (SQL), for purposes of defining rules for alert generation. Context can comprise, for example, historical data.

Exemplary System

Basic System Overview

Figure 1:
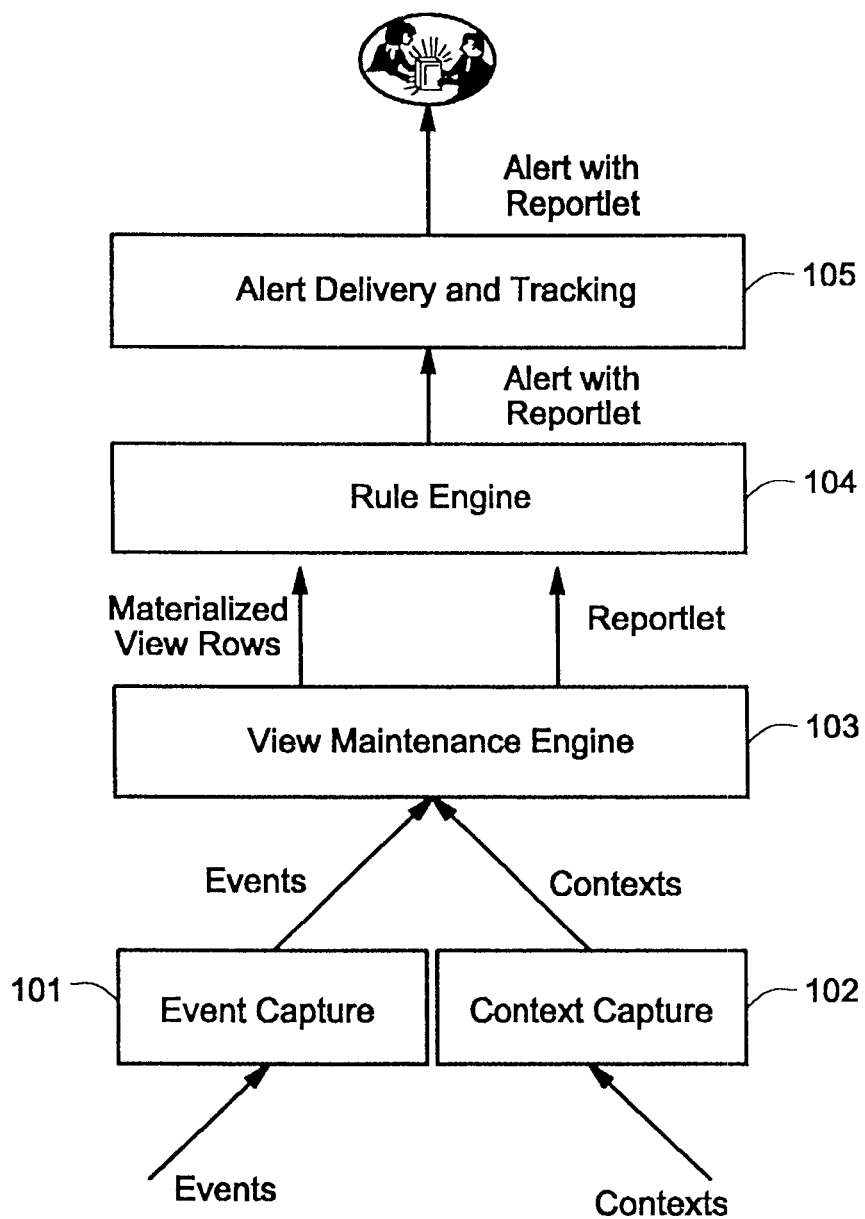
FIG. 1 depicts a system for generating a real time view of heterogeneous enterprise data, according to one embodiment of the present invention.

FIG. 1 depicts a system 100 for generating a real time view of heterogeneous enterprise data, according to one embodiment of the present invention. System 100 thus functions as a business activity monitoring (BAM) system.

System 100 provides a real time view of heterogeneous enterprise data of an operational system, comprising capturing a stream of operational events in real time and materializing a resulting view. The resulting view comprises a dynamically defined view of the stream of events and provides visibility into a current state of the operational system.

There are two fundamental ways of entering data into system 100: push and pull. System 100 can subscribe to some events and the event data would then be pushed to the system. System 100 can also pull data for events and contexts using queries in the source system format.

Push of data into system 100 is done asynchronously. System 100 subscribes to event publishers, through asynchronous publishing mechanisms such as a Java messaging service (JMS) message bag. Pulling of data into system 100 is done through issuing synchronous (blocking) queries to the source systems.

System 100 models the event as an event view, and the context data as a context view. Events are captured by an event capturer 101, which outputs the captured event to a view maintenance engine 103. Contexts are captured by a context capturer 102, which outputs the captured context to the view maintenance engine 103.

View maintenance engine 103 materializes views as rows. View maintenance engine 103 outputs materialized view rows, along with any corresponding reportlets it generates, to a rule engine 104.

Rule engine 104 applies a business rule to each materialized view and outputs a alert where the rule holds true to an alert deliverer/tracker 105. The alert is sent along with any corresponding reportlets.

Alert deliverer/tracker 105 delivers and tracks the alert, along with any reportlets, to users. The alert and any reportlets can be sent by any of a variety of media, such as email, a hypertext transfer page (HTTP) format, and/or a spreadsheet.

Exemplary View Engine

Figure 2:
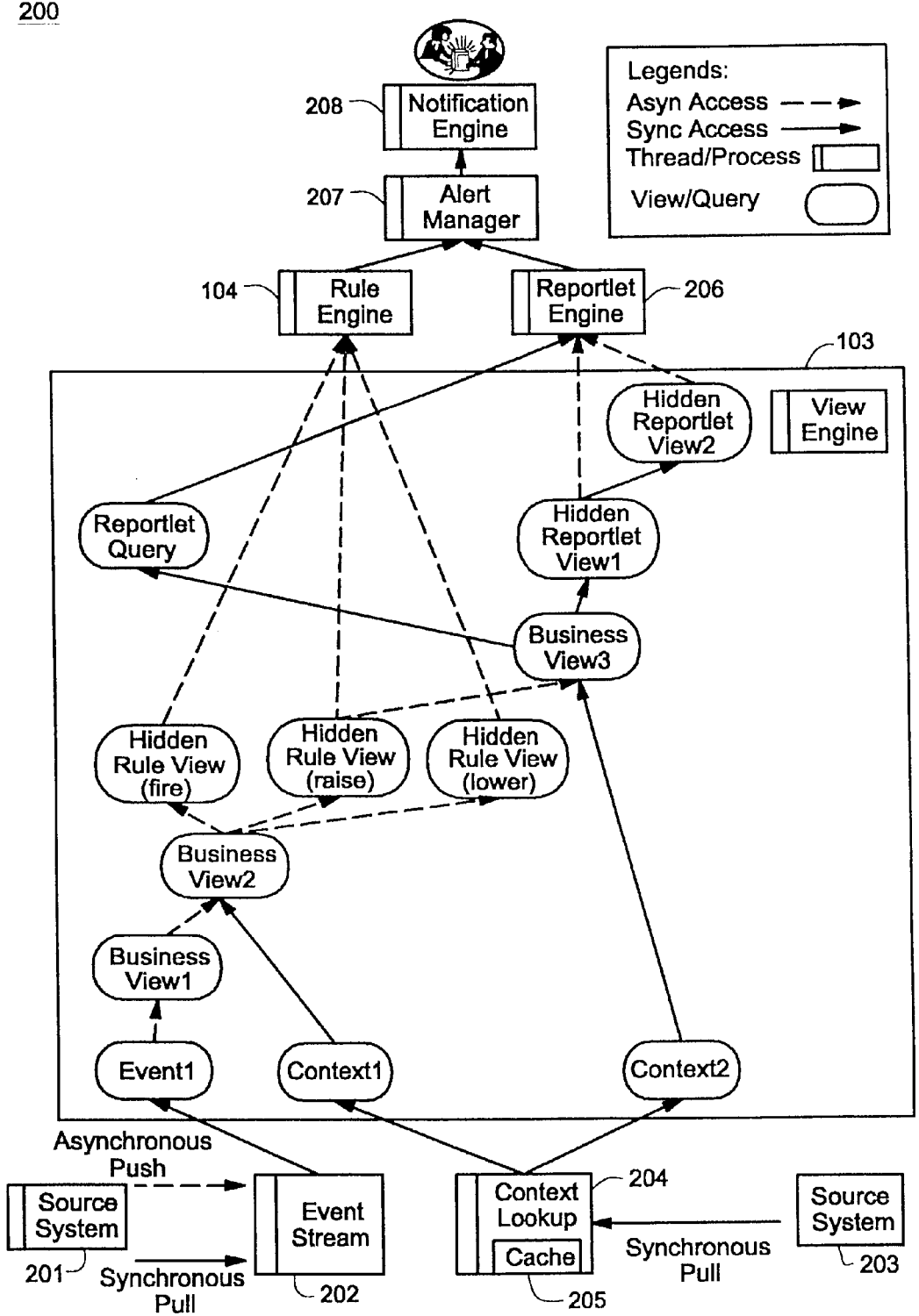
FIG. 2 depicts a view engine, according to one embodiment of the present invention.

FIG. 2 depicts a system 200 for generating a real time view of heterogeneous enterprise data, according to one embodiment of the present invention. FIG. 2 also depicts view maintenance engine 103, according to one embodiment of the present invention. The view engine 103 maintains (e.g., functions as) a main memory system that processes the event streams entering system 100, continuously maintains the views, and provides the materialized view rows to the rule engine and the reportlet engine. The view engine 103 also provides a limited query capability for a reportlet engine 206. Business users use the materialized views to define business rules online. Further, view engine 103 maintains a time dimension, allowing for temporal or time series analysis of events and data.

There are two kinds of views: business views and hidden views. The business views are the views defined by application developers and used by the business users to define business rules. The hidden views are defined by the rule engine 104 and reportlet engine 206 for the purpose of evaluating rules.

The hidden views are therefore generated by the system 100 and are not visible to the users. The hidden views are processed similarly as the business views. Therefore for clarity, brevity, and ease of explanation, reference to business views herein also includes reference to hidden views, unless otherwise noted explicitly.

An event stream thread 202 is asynchronously pushed or synchronously pulled from a source system 201. View engine 103 receives an event from event stream thread 202 of event capturer 101 (FIG. 1).

Context can include historical or other data meaningful to an event. Context can add significance to the event. The context 204, modeled as a relation, has a local cache 205 that can return cached context look up query result. Context can be synchronously pulled by context capturer 102 (FIG. 1) from a source system 203, such as a data warehouse.

Business view 1 is formed from Event 1. Event 1 is joined with Context 1 to form Business view 2. Hidden rule view Fire, hidden rule view Raise, and hidden rule view Lower arise from Business view 2. Hidden rule view Raise is joined with Context 2 to form Business view 3, which synchronously sends a reportlet query to reportlet engine 206. Business view 3 can also asynchronously form a Hidden Reportlet view 1 which can be sent to reportlet engine 206. Hidden reportlet view 1 can also synchronously form Hidden Reportlet view 2. Hidden Reportlet views 1 and 2 are asynchronously sent to reportlet engine 206. Hidden rule views Fire, Raise, and Lower are sent asynchronously to rule engine 104.

Exemplary View Maintenance Network

Figure 3:
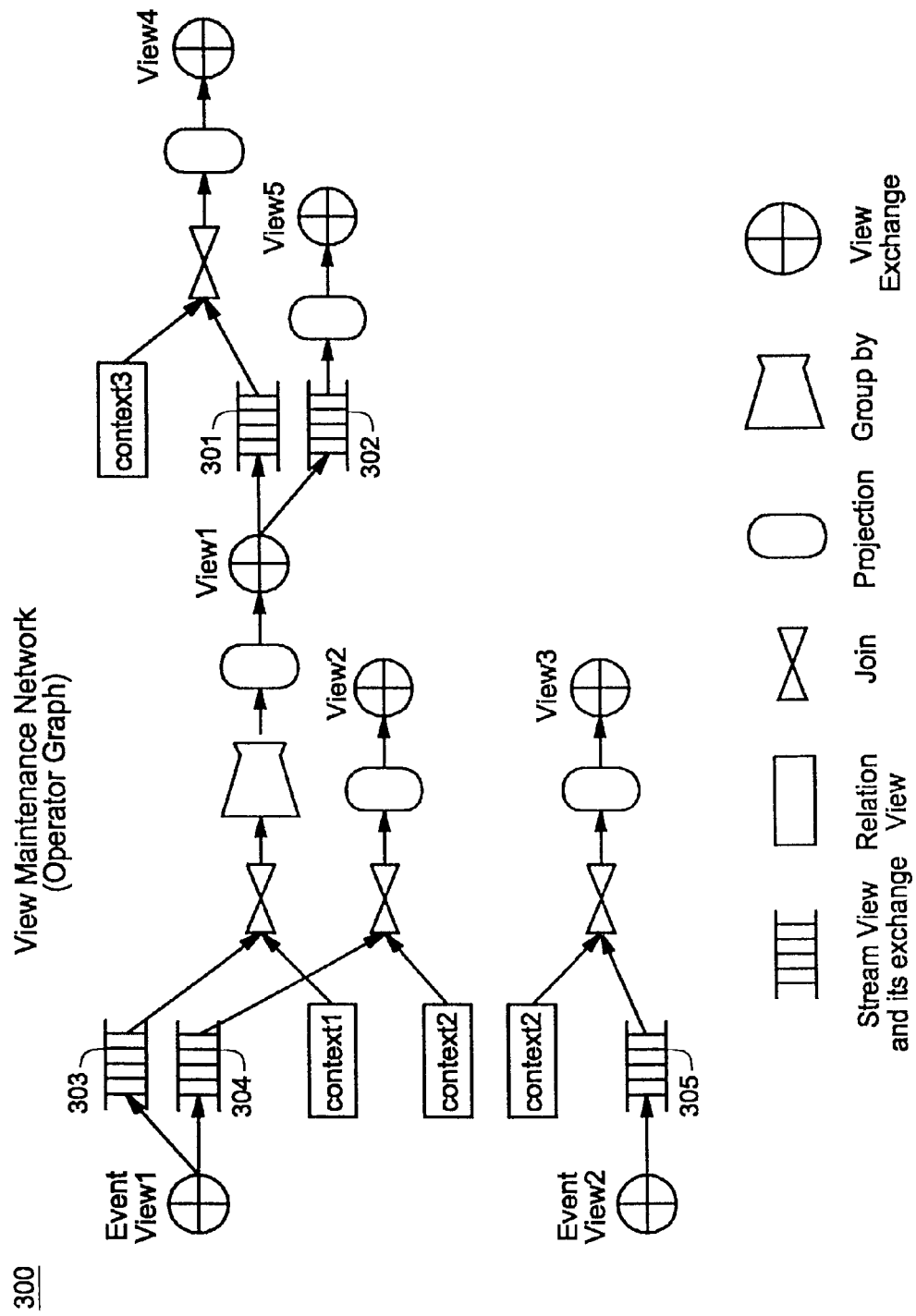
FIG. 3 depicts a view maintenance network, according to one embodiment of the present invention.

FIG. 3 depicts an exemplary such view maintenance network, according to one embodiment of the present invention. Each node in the network represents an operator. Views are expressed in the form of a query language such as SQL. The following shows an example of a business view 'price_and_inventory_monitor'.

```
Select os_prod_id as pim_prod_id
    Mov_avg(os.os_unit_price, month, 1 )as pim_unit_price,
    Mov_sum(pi.pi_inv_level,day,2) as pim_inventory_level
From order_status os, product_inventory pi
Where pi.pi_prod_id =os.os_prod_id
Group by os_prod_id
```

The above view captures, on a per product basis, the monthly moving average of the selling price of a product, and the 2-day moving total of its inventory levels across all warehouses. The order_status is an event stream and product_inventory is a context view. A view (e.g., views 1-5) comprises the result of the join of an event view (e.g., event views 1, 2) or a view (called input stream) with a number of context views (called relation; e.g., contexts 1-3). Each view would then publish stream data (called output stream; e.g., output streams 301, 302)) as the result of the view maintenance. The result of one view's output steam can be subscribed by another view (e.g., views 4, 5) as input steam, and the entire system thus becomes a view maintenance network 300.

Figure 4:
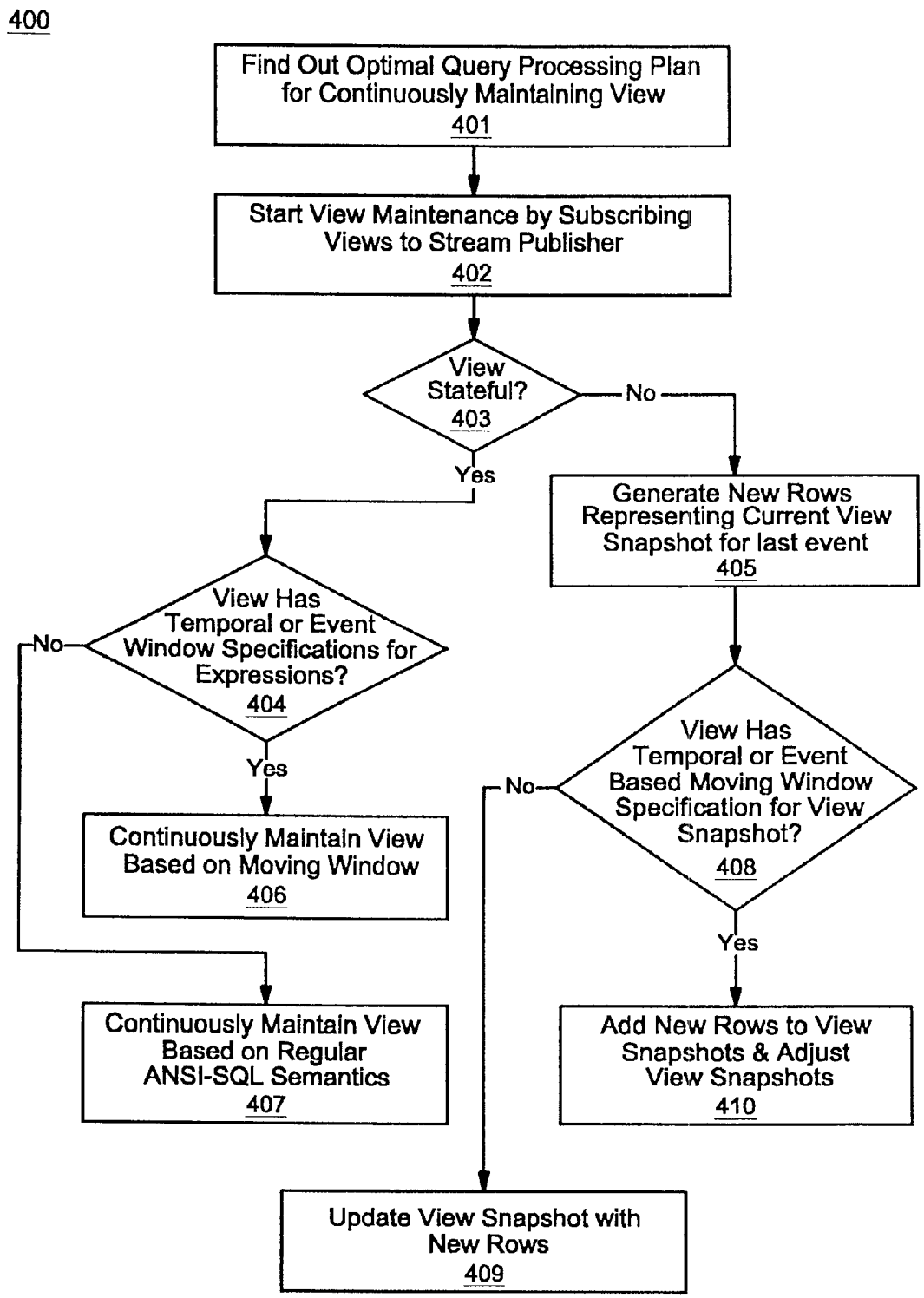
FIG. 4 is a flowchart of a process for compiling and enabling a business view, according to one embodiment of the present invention.

View maintenance network 300 performs a process 400 which can be described by the flowchart of FIG. 4. Process 400 compiles and enables a business view beginning with step 401, wherein for each business view, the optimal query processing plan (which can be algorithmic) is determined for continuously maintaining the view. In step 402, the view maintenance is started by subscribing the views to the stream publisher. In step 403, it is determined whether the view is stateful.

If it is determined that the view is stateful, then in step 404, it is determined whether the view has temporal or event window specifications. If it is determined that the view has temporal or event window specifications, then in step 406 the view is continuously maintained based on a moving window corresponding to the temporal or event window specifications. If it is determined that the view has no temporal or event window specifications, then in step 407, the view is continuously maintained based on regular ANSI SQL semantics.

If it is determined that the view is not stateful (e.g., if the view is stateless), then in step 405, new rows are generated that represent the current view snapshot for the last (e.g., latest) event. It is next determined in step 408 whether the view has a temporal or event based moving window specification for the view snapshot. If not, then in step 409, the view snapshot is updated with new rows.

If it is determined that the view has a temporal or event based moving window specification for the view snapshot, then in step 410, new rows are added to the view snapshots and the view snapshots are adjusted. Process 400 can be complete upon executing steps 406, 407, 409, or 410.

Referring again to FIG. 3, the view can be continuously maintained (e.g., Step 403 of Process 400; FIG. 4) by a process as described next. The view result (called view snapshot) at a time T contains the result of the view evaluation from the time the system is started until time T, by taking all rows arriving by time T from the event view, and joins them with the rows in the context views. For instance, the rows comprising stream 303 are joined with the rows comprising context 1. Similarly, the rows comprising stream 304 are joined with the rows comprising context 2, as are the rows comprising stream 305.

The view snapshot is continuously maintained, e.g., it is created based on the first event, and then continuously updated based on subsequent events. The next event joins with the context rows and may or may not cause an update on the snapshot of the view. The view snapshot itself is a data stream that feeds into the next view. In one implementation, the view engine 103 (FIG. 1) effectively feeds change to a stream to views that defined on top of it, so that all views are continuously maintained.

Figure 6:
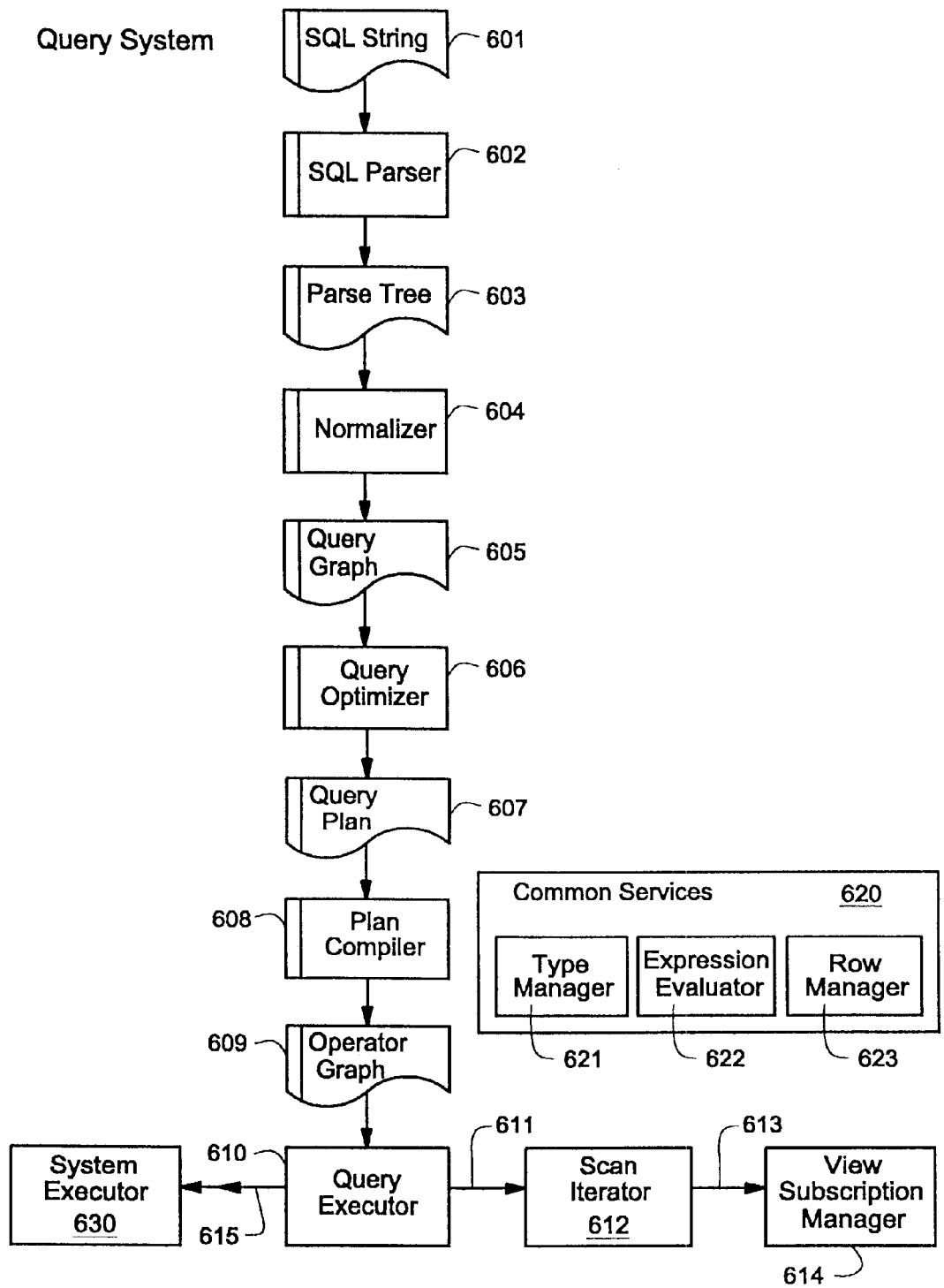
FIG. 6 depicts a query engine view processor, according to one embodiment of the present invention.

Therefore, view maintenance in the present embodiment comprises continuous incremental view maintenance, as distinguished from incremental view maintenance. The data in the context views are static or slowly changing. A query engine (e.g., query engine 600; FIG. 6) does not update the view due to changes in the context tables. Changes in the context table rather would be reflected in the view when the context table is joined with the next event row.

For a SQL view query, the query engine first executes a FROM clause, which performs joins across multiple views. Exactly one of the views should be an event view, and the remaining should be context views. An event is modeled as a data stream, and a context view is modeled as a relation. The rows enter into the event view one event at a time (one event can contain multiple rows).

The rows for the context views are retrieved on demand during the join process, which can be exemplified as follows:

```
For each stream row Do
    Fetch the event row
    For each context view in the order determined by the optimizer Do
        Formulate a context query for the context view
        Issue the context query to the context source and retrieve
            the result
```

At this stage, compound rows have been constructed, each row consisting of one row from the stream and each context view. The view snapshot is incrementally maintained based on the new row.

The result of the view maintenance produces the current view snapshot, which depicts the current state of the view. In one embodiment, an update to the view snapshot is done only when a new input stream row is produced. In the present embodiment, the process does not update the view snapshot due to changes to the context views. The view also maintains a time window of events and context. Such view maintenance is thus continuous incremental view maintenance, in contrast to incremental view maintenance.

Figure 5:
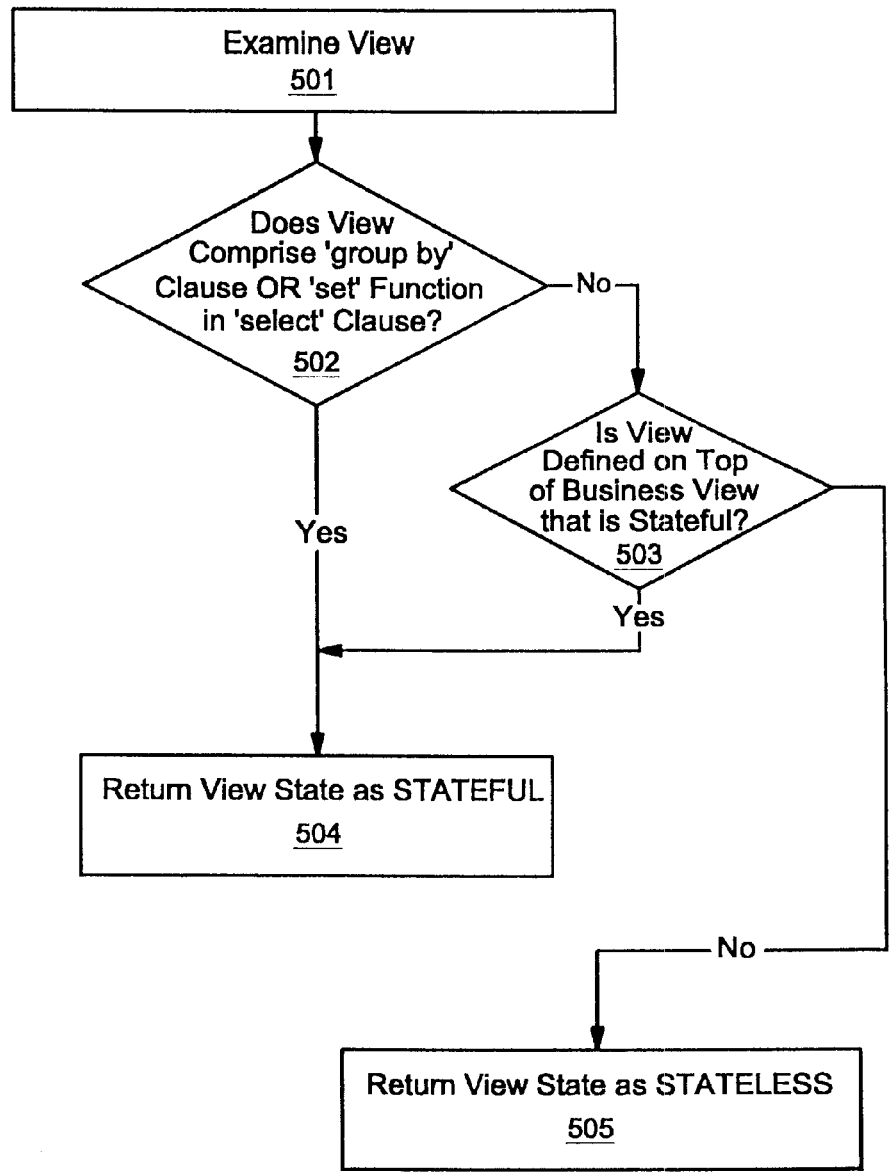
FIG. 5 is a flowchart of a process for determining the statefulness of a view, according to one embodiment of the present invention.

A view is a stateless view if it is not stateful. An event view (e.g., event views 1, 2; FIG. 3) is stateless. A view is stateful is it contains a GROUP BY clause or any set function in the SELECT clause, or it is defined on top of a stateful view. Thus, a process 500 for determining whether a view is stateful or stateless is depicted in FIG. 5. Process 500 begins with a step 501, wherein a view is examined. In step 502, it is determined whether the view comprises a 'group by' clause or a 'set' function in a 'select' clause.

If so, then in step 504, the view state 'STATEFUL' is returned, at which point process 500 can be complete. If not, then in step 503, it is determined whether the view is defined on top of a business view that is itself stateful. If so, then in step 504, the view state 'STATEFUL' is returned. If not, then in step 505 the view state 'STATELESS' is returned, completing process 500. The system then sets the view state in a bottom up fashion: the views other views define on are marked for statefulness before those views defined on top of them.

Exemplary Query Engine

FIG. 6 depicts a query engine 600, according to one embodiment of the present invention. A SQL parser 602 receives a SQL string 601 and parses it. SQL parser 602 outputs a parse tree 603 to a normalizer 604. Normalizer 604 normalizes the parse tree 603 and outputs a query graph 605 to a query optimizer 606. Query optimizer 606 outputs a query plan 607 to a plan compiler 608. Upon compiling the query plans 607, plan compiler 608 outputs an operator graph 609 to a query executor 610. Query executor 610 executes the queries. Common services 620 available comprise a type manager 621, an expression evaluator 622, and a row manager 623.

A view, defined in SQL string 601, is submitted to the query manager 600 for enabling in the view maintenance network. The query manager 600 calls the parser 602, normalizer 604, optimizer 606, and plan compiler 608, with the view definition SQL string 601, to come up with an Executable Plan 615, which is executed by query executor 610. The Executable Plan is a query iterator tree. The query manager 600 then asks the executor 610 to open the query iterator tree. The query executor 610 opens all the iterator nodes 611 in the tree, the open operation of the stream (event view or view) scan iterator 612 makes a subscription request 613 to the view subscription manager 614, which puts the current Executable Plan object as one of the subscribers of the view. The query manager 600 then submits the Executable Plan 615 to the system executor 630, which executes the view maintenance operations.

Figure 7:
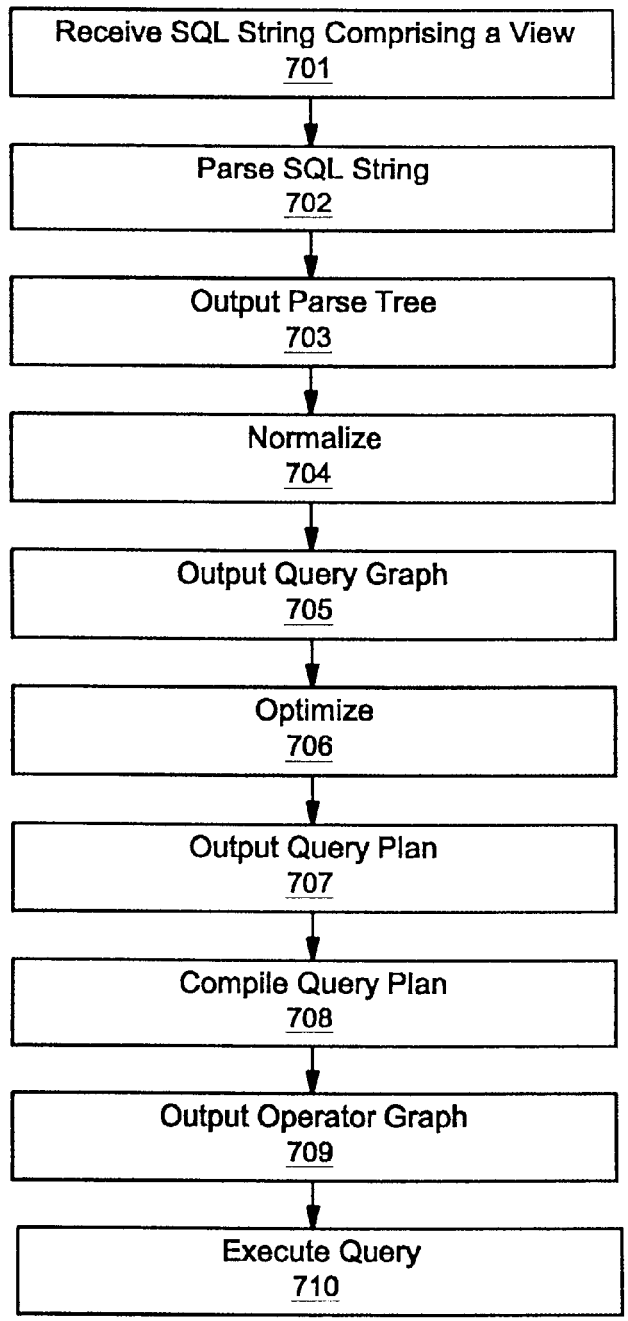
FIG. 7 is a flowchart of a process for processing a view, according to one embodiment of the present invention.

Query engine 600 operates by a process 700 depicted in FIG. 7. Process 700 begins with step 701, wherein a SOL string comprising a view is received. In step 702, the SOL string is parsed. In step 703, a parse tree is output. In step 704, the parse tree is sent to 25 a normalizer, where it is normalized in step 705. In step 706, the query is optimized. In step 707, a query plan is sent to a query compiler, which compiles it in step 708. In step 709, an operator graph is sent to a query executor, which in step 710 executes the query.

Each physical iterator operates on a number of rows and produces a number of rows. It may take two inputs (e.g., join) or one input (e.g., group by). All operators are independent of one another. The operators are linked together by the optimizer to form an operator DAG (query iterator graph) 609, which is an executable form to be executed by the query executor 610. An operator does not know the detail of another operator. They are linked together by the optimizer 606.

Referring again to FIG. 6, each operator performs one specific functionality: it contributes to one step in the process of continuously maintaining the view snapshot. All operators except the view exchange operator do not need to consider multi-threading issues. The query execution plan 607 is represented as an operator graph 609, and the operator graph 609 is invoked from the top to bottom using the open( ) call recursively. Each operator has an array of children operators.

Each operator implements methods as listed in Table 1 below.

TABLE 1

Create( ): instantiate the operator and all of its children.
Open ( ): open an iterator, and open all its children. This prepares the operator for incremental view maintenance.
Next (QEDataContext): get next row from the operator. The new row is stored at the QEDataContext. The QEDataContext object contains information about the new row being assembled.
    Return NEXT when there is a new row in the QEDataContext.
    Return STREAMDONE if it reaches the end of the rows for the current stream. Then the caller needs to call next( ) again to get the rows for the next event. This only applies to iterators for stream. A stream iterator is either a StreamScanIterator or any iterator above it.
    Return DONE to indicate no more rows.
    For relational source, this call either returns NEXT or DONE, it would never return STREAMDONE. This only applies to RemoveScanIterator or join iterator that do not have any stream iterator below it
    An iterator would return STREAMDONE if it gets STREAMDONE from its child iterator.
Close ( ): free all operator states, close this iterator and close all its children
Free ( ): free resources and destroy the iterator and its children
The entire query execution plan is a graph of query operators. An operator is in the status of one of the following, at any point in time:
    COMPILATION: plan compilation phase
    CREATE: the iterator has just been instantiated
    OPEN: the iterator has just been opened for processing the next event
    NEXT: at least one RowList has been retrieved from this iterator.
    DONE: end of the data stream has been reached for the last next call
    STREAMDONE: end of the event stream has been reached for the last next call
    CLOSE: its input has been closed.
    FREE: it is being destroyed and freed.

Table 2 below shows processes for the main operators.

TABLE 2

| Operator | Create | Open | Next | Close | Local state |
|---|---|---|---|---|---|
| EventScan: Subscribe to steam. Get stream rows. | Create the operator and all its children | Subscribe to stream. | Next event row or return Done. Apply filters | Un-subscribe | Unreturned rows |
| View exchange: maintain view snapshot | Same as above | Open input | Input.next( ) until hit STREAMDONE, then publish new snapshot. Then call input.next( ) again | Input.close( ) | VCRow[ ] which is the snapshot of the query. |
| RemoteScan: Scans a context table. Optionally look up cache | Same as above | Open a source and prepare a statement for jdbc source. Initialize a context cache if set | Extract the bind values from Rows. call BindAndExecute( ). Apply filters. Return one row. Return the rest in subsequent next( ) calls. | Close the source | Context cache. Prepared statement handle. Unreturned Rows |
| Nested Loop Join | Same as above | Input.open( ), Input2.open( ) | Call input.next( ) to populate the left table row, if success, then call input2.next( ). If success, apply post join filters. Join filters are being applied at the input2 iterator. | Input.close( ) Input2.close( ) | None |
| Groupby: groupby and set function evaluation | Same as above. | Input.open( ). | Keep calling Input.next( ) until see STREAMDONE or DONE, then perform group by. Then evaluate the aggregation expressions by putting new row in the right group. Return one row at a time to its caller. Setting the implicit column values | Input.close( ) | Unreturned rows. Grouped rows in the hash table |
| Projection: project wanted columns | Same as above | Input.open( ) | Input.next( ).Apply post select filters. Copy out VcValue. Set implicit VC column values. | Input.close( ) | |

Figure 8:
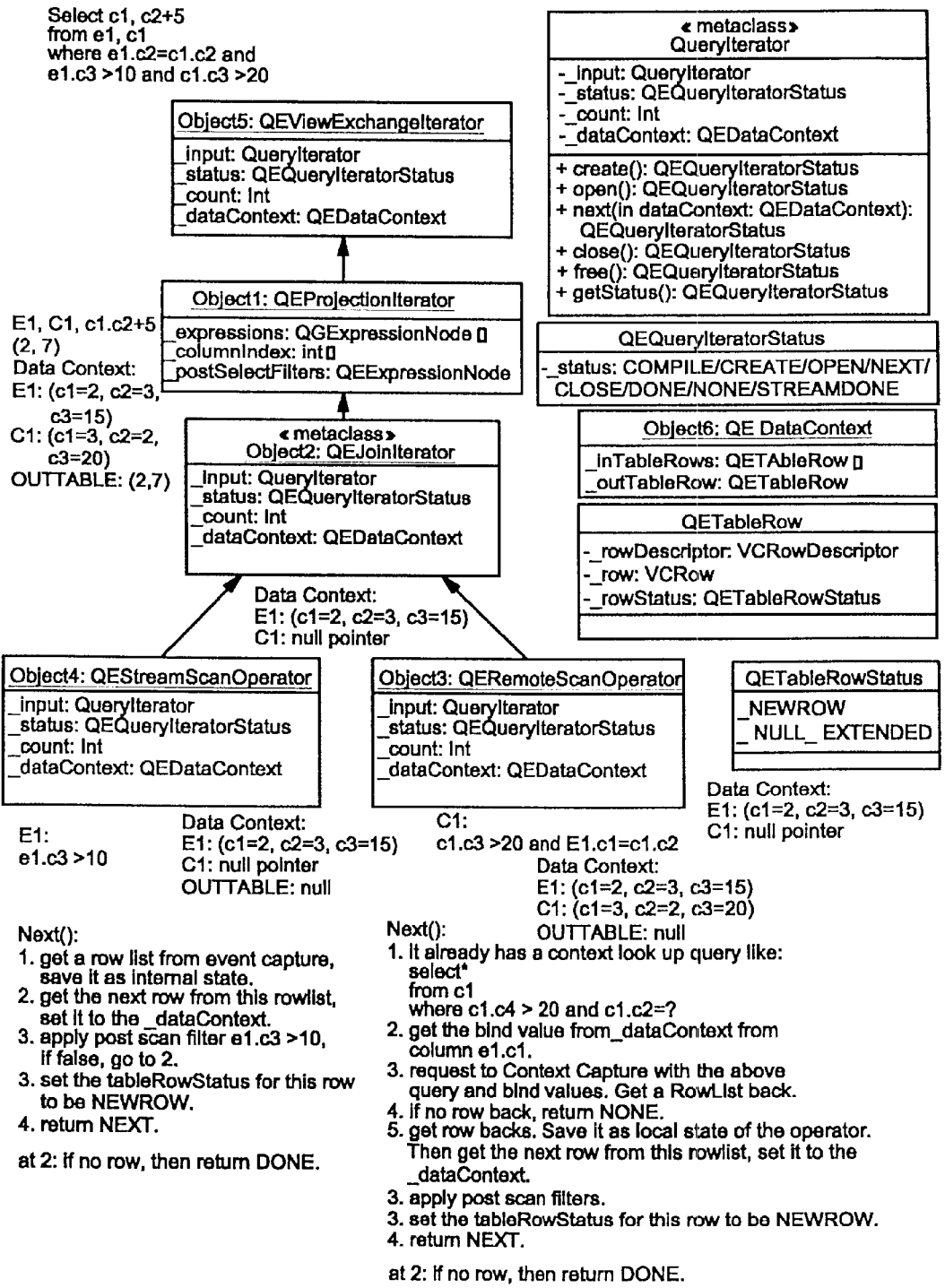
FIG. 8 depicts a query iterator graph, according to one embodiment of the present invention.

FIG. 8 depicts an exemplar of query operator graph 609. Each view contributes a number of operators in the entire view maintenance network, and the entire view maintenance network becomes a one directional operator graph. An exemplar of such an operator network is depicted in FIG. 3 as view maintenance network 300.

Stateful queries can exist, which differ from the view. The views are continuously incrementally maintained, each maintenance operation is triggered by a new stream event. The queries also have states, and its states are incrementally maintained. However, its maintenance is triggered based on a given set of input rows, passed in by the caller. The format of these rows are the same the as input stream rows.

Reportlets, alerts, and rules are converted into views and queries as depicted in FIG. 2, describing view engine 103. For a rule on a business view 'bView' in the form of WHEN (<Boolean expression>)
FIRE ALERT <alert name> the <Boolean expression> is evaluated for each row in the business view and the alert is fired once for each row for which the Boolean expression evaluates to true.

The business view can be converted into the following hidden view:

```
Select *
From bView
    WHERE (<Boolean expression>)
```

For a rule on a business view bView in the form of

```
WHEN (<Boolean expression>)
FIRE CONSOLIDATED ALERT <alert name>
``` the <Boolean expression> is evaluated for each row in the business view and the alert is fired once if the Boolean expression evaluates to true for any of the rows. The bView can be converted it into the following hidden view:

```
Select 1
From dummyOneRowTable
Where EXISTS (Select 1
From bView
WHERE (<Boolean expression>))
```

DummyOneRowTable is a table containing one row.
For a rule on a business view bView in the form of

```
WHEN (<rule Boolean expression>)
RAISE ALERT <name of the alert>
``` bView can be converted it to the following view:

```
Select *
From bView
WHERE (<Boolean expression>) and
vc_event_id = vc_latest_event_id
```

For a rule on a business view bView in the form of

```
WHEN (<rule Boolean expression>)
LOWER ALERT <name of the alert>
``` bView can be converted it to the following view:

```
Select *
From bView
WHERE (<Boolean expression>) and
vc_event_id = vc_latest_event_id
```

For a rule on a business view bView in the form of

```
WHEN (<rule Boolean expression>)
HOLDS FOR <duration>
RAISE ALERT <name of the alert>
``` bView can be converts it to the following view:

```
Select bView.*, <duration> + currentTimeStamp( )
From bView
WHERE (<Boolean expression>) and
vc_event_id = vc_latest_event_id
```

The function currentTimeStamp( ) returns the current timestamp.
For a rule on a business view bView in the form of

```
WHEN (<rule Boolean expression>)
HOLDS FOR <duration>
RAISE ALERT <name of the alert>
FOR A SPECIFIC <view_column_list>
``` bView can be converted it into the following view:

```
Select bView.*, <duration> +currentTimeStamp( ),
<view_column_list>
From bView
WHERE (<Boolean expression>) and
vc_event_id = vc_latest_event_id.
```

The alert manager 207 provides to notification engine 208, the reportlet message as the mechanism to add additional context to the business view that caused the alert. A reportlet attached to an alert is any view in the system that is derived from the same base event that caused the alert to be raised/fired.

There are three kinds of reportlets. One kind of reportlet is populated by using only the rows affected by the current event. For the first case, the reportlet is defined as a regular business view. A second kind of reportlet is populated by using all the rows in the business view. For the second case, the reportlet is defined as a business view, plus the following additional where clause condition:

vc_event_id=vc_latest_event_id.

The third kind of reportlet is populated by using only the rows for which the rule evaluates to true. For the third case, the reportlet is maintained by the stateful query mechanism as described above: the rows produced by the hidden associated rule view are passed to the query view and the reportlet is populated as the view snapshot.

A Java database connectivity (JDBC) context view is defined as a regular JDBC SQL query, say <context-query-definition>. A context lookup query for a two table joined view

```
select <select expression list>
from streamTable, contextTable
where <search-conditions>
``` is formulated based on the following algorithm-2-table-join-context-lookup:

```
convert the <search-condition> into conjunctive normal form
<new-search-condition> = true
For all conjunct in the normal form
    construct a new <condition-expression> by replacing all
```

```
references in the conjunct to non-context column in the query as bind
value (represented as a ':' symbol).
        <new-search-condition> := <new-search-condition> and
<condition-expression>
    Formulate the context lookup query as follows:
        select *
        from (<context-query-sql-definition>) a
            where <new-search-condition>
```

In the case of multiple context table references, the process proceeds with the optimizer generating a join plan, each join node joining only two tables. A n-table join becomes n−1 join nodes of two table joins. The join takes the form of a left deep tree, which first joins the stream table with a context table, the join result then joins with the next context table, and so on. The following shows an example of the left-deep join plan:

```
        for each two table join
            invoke algorithm-2-table-join-context-lookup to construct
        the context look up query for the context table
```

Figure 9:
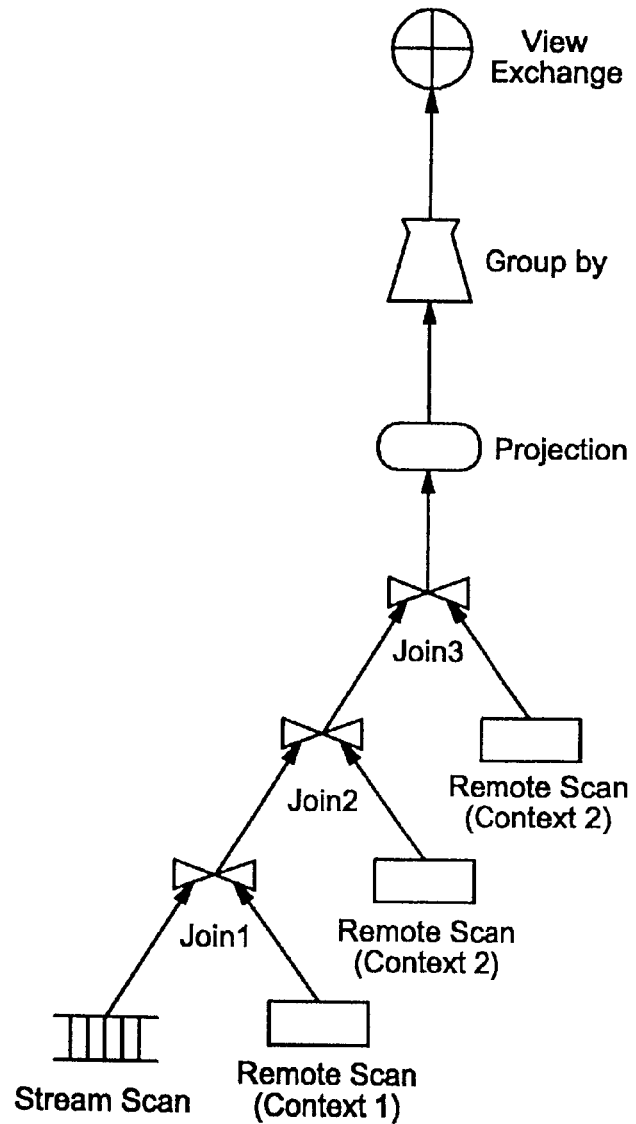
FIG. 9 depicts a left deep query tree, according to one embodiment of the present invention.

This is depicted in FIG. 9 as a left deep query tree 900. In one embodiment, the query comprises a context query in SQL, other than a JDBC query.

Query tree 900 is extended to cover the case when a bushy query plan is created by the optimizer:

```
for each two table join
    if the left input of the join is a context table
        invoke algorithm-2-table-join-context-lookup to construct the
        context look up query for the context table
    if the right input of the is a context table
        invoke algorithm-2-table-join-context-lookup to construct the
        context look up query for the context table
```

Figure 10:
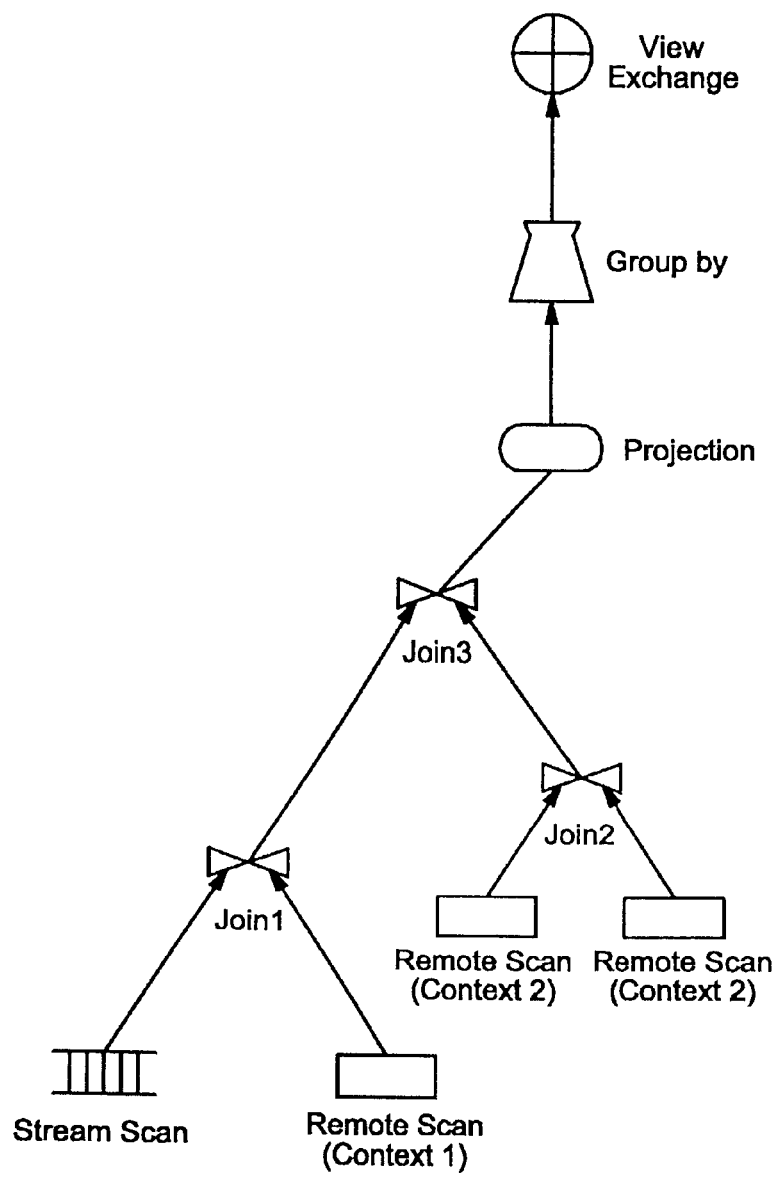
FIG. 10 depicts a bushy query tree, according to one embodiment of the present invention.

Query tree 900 applies to the case when the join type is either an INNER join or a Left outer join. All right outer join has been converted into left outer join by exchanging the position of the inner and outer table, therefore the optimizer does not need to deal with right outer join. A bushy query plan 1000 is depicted in FIG. 10.

Exemplary Process

Figure 11:
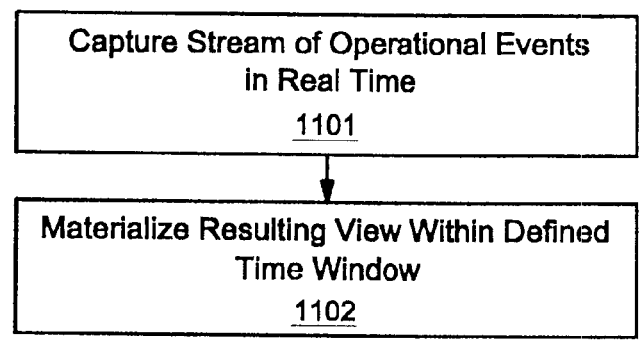
FIG. 11 is a flowchart of a process for generating a real time view of heterogeneous enterprise data, according to one embodiment of the present invention.

FIG. 11 is a flowchart of a process 1100 for providing a real time view of heterogeneous enterprise data of an operational system. Process 1100 begins with step 1101, wherein a stream of operational events is captured in real time. In step 1102, a resulting view is materialized within the defined time window. The resulting view comprises a dynamically defined view of the stream of events and provides visibility into a current state of the operational system. Thus, process 1100 comprises a method by which a system for generating a real time view of heterogeneous enterprise data (e.g., System 100; FIG. 1) operates. Process 1100 can be performed by a computer system or network of computer systems under the control of a computer readable program code embodied in a computer usable medium.

In summary, a method for generating a real time view of heterogeneous enterprise data is disclosed. Embodiments of the present invention are directed to a method for generating a real time view of heterogeneous enterprise data that is both event-definitive and context-definitive. An embodiment of the present invention readily formulates and sustains a maintainable real time view of business events, such as transactions, and related occurrences, incidents, and circumstances. Further, an embodiment of the present invention has contextually interpretive and dynamically predictive usefulness.

An embodiment of the present invention, a method for generating a real time view of heterogeneous enterprise data, is thus described. While the present invention has been described in particular embodiments, it should be appreciated that the present invention should not be construed as limited by such embodiments, but rather construed according to the below claims and their equivalents.

What is claimed is:

1. A method comprising:
    capturing a stream of operational events; and
    materializing, by an activity monitoring computer system, a resulting view, wherein the resulting view comprises a dynamically defined view of the stream of operational events, wherein the materializing of the resulting view comprises:
        forming a row for at least one event in the stream of operational events;
        capturing a context that comprises data relevant to the at least one event; and
        joining the context with the row to form a compound row within the resulting view; and
        when a business rule applied to the resulting view holds true, outputting a reportlet corresponding to an alert that is based at least in part on the business rule.

2. The method as recited in claim 1, wherein the capturing comprises receiving the stream of operational events, wherein the stream of operational events is pushed into the activity monitoring computer system.

3. The method as recited in claim 2, wherein the receiving comprises subscribing to the stream of operational events and wherein the receiving is performed asynchronously.

4. The method as recited in claim 3, wherein the subscribing comprises subscribing to an event publisher.

5. The method as recited in claim 4, wherein the subscribing is performed by an asynchronous publishing mechanism.

6. The method as recited in claim 5, wherein the asynchronous publishing mechanism comprises a messaging system.

7. The method as recited in claim 1, wherein the capturing comprises receiving the stream of operational events, wherein the stream is pulled into the activity monitoring computer system.

8. The method as recited in claim 7, wherein the method defines context, and wherein the receiving is performed synchronously and comprises issuing a blocking query to a source system.

9. The method as recited in claim 1, wherein the materializing the resulting view comprises:
    formatting the resulting view as a plurality of compound rows that each contain contextual data joined with event data; and
    outputting the view to a rule engine.

10. The method as recited in claim 9, wherein the capturing and the joining are performed before the outputting, and wherein the resulting view is constructed based on a defined time window.

11. The method as recited in claim 10, wherein the capturing the context comprises pulling the context from a source system, wherein the pulling is performed synchronously.

12. The method as recited in claim 1, further comprising outputting a reportlet to a rule engine, wherein the reportlet comprises information relevant to an event comprising the stream of operational events and additional context.

13. A method for updating a view snapshot of a view, comprising:
subscribing the view to a stream publisher, wherein the stream publisher publishes a stream of data corresponding to the view; and
continuously maintaining, by an activity monitoring computer system, the view corresponding to the stream of data, wherein continuously maintaining of the view comprises:
forming a row for event data that is included within the stream of data;
joining contextual data with the row to form a compound row within the view; and
wherein the contextual data comprises data selected from a group consisting of static data and changing data, and
wherein when the contextual data comprises the changing data, a change in the contextual data is reflected upon joining the change in the contextual data with a subsequent event row.

14. The method as recited in claim 13, wherein the view comprises a joiner selected from a group consisting of a first event view with a second event view, and the input stream with a context view for the contextual data.

15. The method as recited in claim 13, wherein the view snapshot comprises an input stream for a subsequent view.

16. A method comprising:
capturing a stream of operational events in real time;
materializing a resulting view, wherein the resulting view comprises a dynamically defined view of the stream of operational events;
returning, by an activity monitoring computer system, a state comprising the resulting view as stateful if the resulting view, which is defined by a query that includes one or more query clauses, comprises an element selected from a group consisting of a "group by" clause and a "set" function in a "select" clause within the query; and
returning, by the activity monitoring computer system, a state comprising the resulting view as stateless if the resulting view does not comprise an element selected from a group consisting of a "group by" clause and a "set" function in a "select" clause and if the resulting view is not defined on top of a stateful view.

17. A method comprising:
capturing a stream of operational events in real time; and
materializing, by an activity monitoring computer system, a resulting view, wherein the resulting view comprises a dynamically defined view of the stream of operational events, wherein the materializing of the resulting view comprises:
forming a context lookup query comprising a join plan, wherein each join node in the join plan joins a stream table and a context table, the stream table being associated with at least one event in the stream of events, and the context table being associated with context relevant to the at least one event.

18. The method as recited in claim 17, wherein the context lookup query comprises a Java database connectivity (JDBC) context query in structured query language (SQL).

19. The method as recited in claim 17, wherein the context lookup query comprises a context query in SQL wherein the context query does not comprise a JDBC query.

20. The method as recited in claim 17, wherein the context lookup query comprises a two-table join context lookup.

21. The method as recited in claim 17, wherein the join plan comprises a left deep tree, and wherein a corresponding join result joins with a next context table.

22. The method as recited in claim 17, wherein the context lookup query comprises a join plan, wherein the join plan comprises a bushy query plan.

\* \* \* \* \*